Feb. 3, 1931.  H. E. WEBER  1,791,230
ADJUSTABLE BRACKET ARM
Filed March 10, 1927   3 Sheets-Sheet 1

Inventor
Henry E. Weber
By Frease and Bond
Attorneys

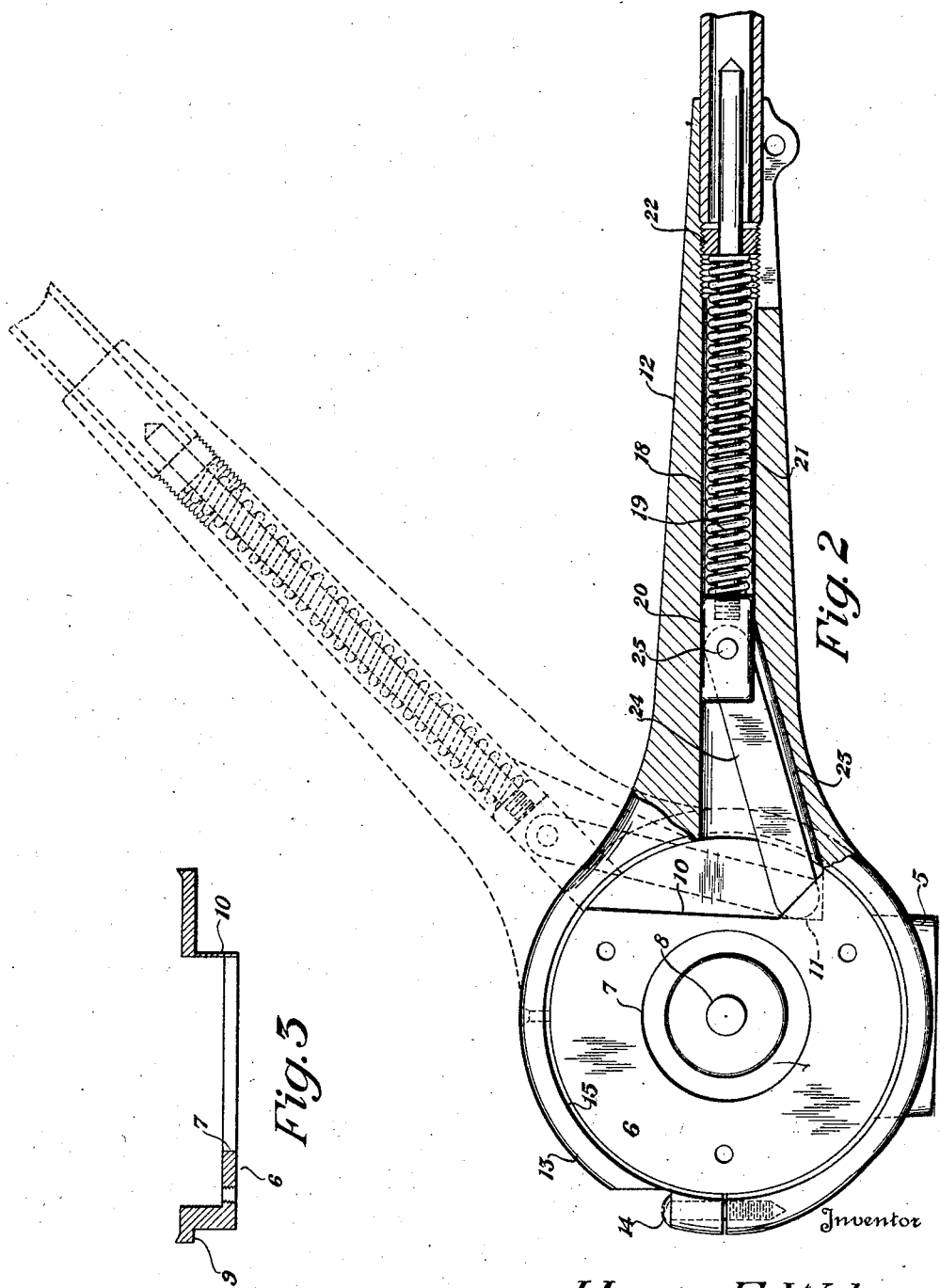

Feb. 3, 1931.  H. E. WEBER  1,791,230
ADJUSTABLE BRACKET ARM
Filed March 10, 1927   3 Sheets-Sheet 3

Inventor
Henry E. Weber
By Frease and Bond
Attorneys

Patented Feb. 3, 1931

1,791,230

UNITED STATES PATENT OFFICE

HENRY E. WEBER, OF CANTON, OHIO

ADJUSTABLE BRACKET ARM

Application filed March 10, 1927. Serial No. 174,321.

The invention relates to bracket arms, especially for dental apparatus, such as cord arms for dental motors, adjustable lamp arms, adjustable arms for X-ray machines and the like.

The invention is especially adaptable to adjustable cord arms for dental engines and is illustrated as applied thereto. Ordinarily the motor of a dental engine is pivoted upon the stand and the cord arm is rigidly connected to the motor, making it necessary to tilt the motor in order to raise or lower the cord arm as desired.

This tilting of the motor throws the motor shaft out of a horizontal plane and this is objectionable not only in that the motor will not operate as effectively when in this tilting position, but also because, especially in hot weather, the oil will drain to one end of the shaft.

The present invention, when applied to dental engines, contemplates the use of a motor fixedly mounted upon the stand with a permanent horizontal axis, the cord arm being carried upon a bracket at one end of the motor whereby the arm may be raised or lowered without disturbing the position of the motor.

The object of the invention is to provide an adjustable arm having a spring pressed rod or plunger carried thereby and pivotally connected to a link located at an angle to the axis of the plunger, and having its free end fulcrumed in a socket within the bracket upon which the arm is pivoted, whereby the pressure of the spring tends to hold the pivoted end of the link upward, forcing one side of the plunger into frictional contact with the arm, whereby the arm may be easily moved to any desired position and rigidly held in the adjusted position.

Figure 1:
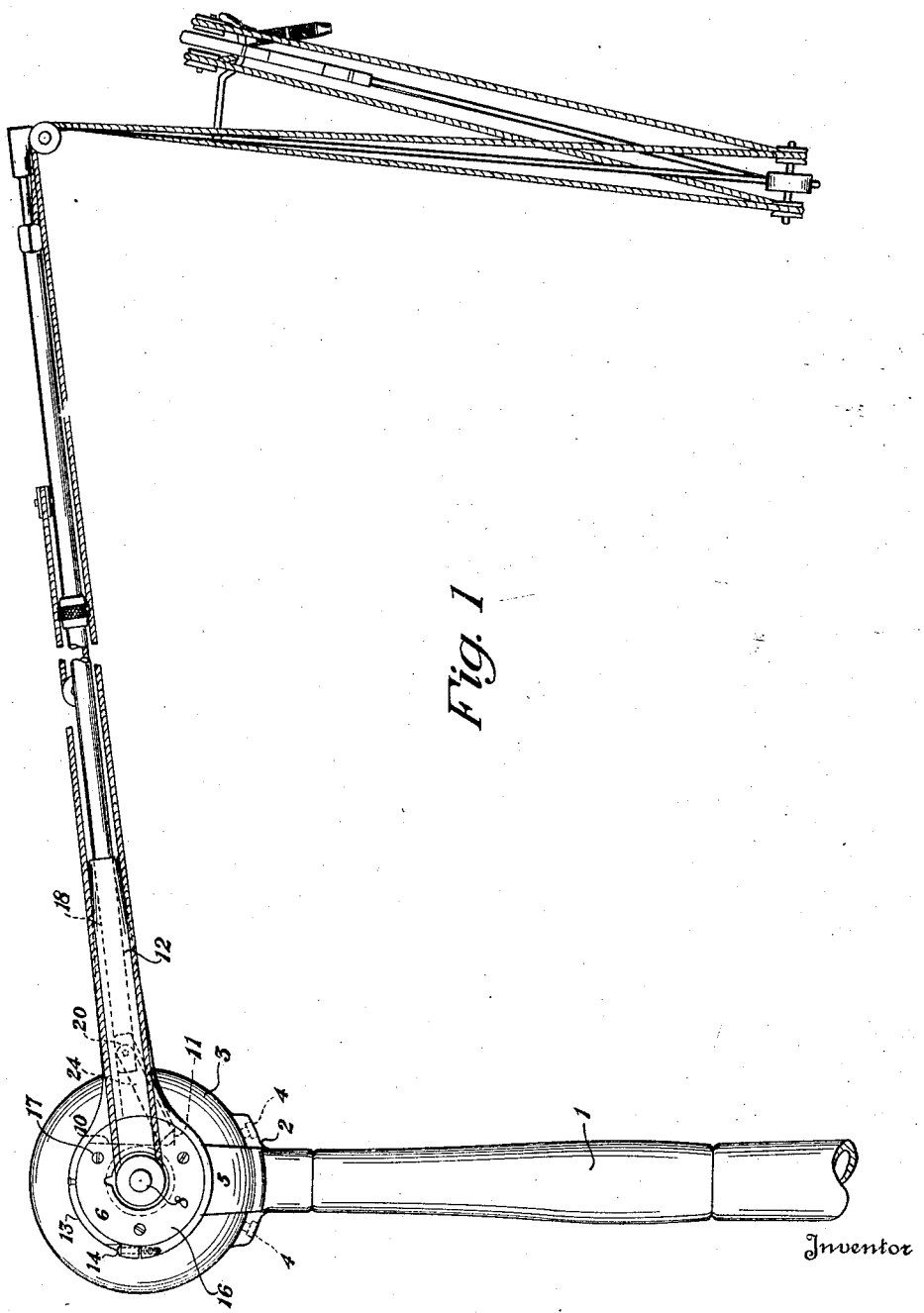
Figure 4:
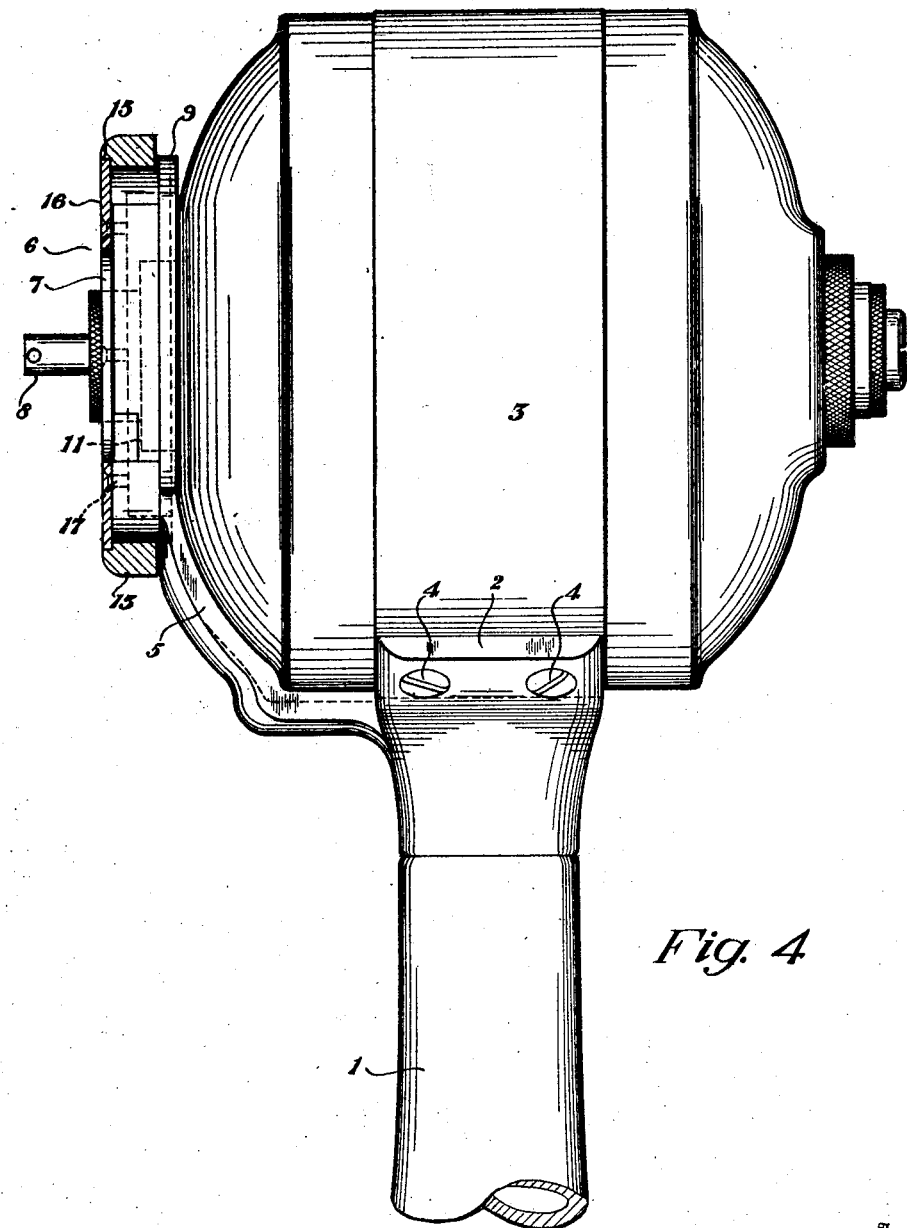

An embodiment of the invention, as applied to the cord arm of a dental engine, is illustrated in the accompanying drawings, in which Figure 1 is a side elevation showing the motor and cord arm;

Fig. 2, an enlarged elevation partly in section of the adjustable arm showing the friction brake means;

Fig. 3, a detached sectional view of the journal member upon which the arm is pivoted; and Fig. 4, a front elevation of the motor, showing the journal portion of the arm in section.

Similar numerals refer to similar parts throughout the drawings.

The usual motor arm is shown at 1, provided at its upper end with a bracket comprising the saddle 2 which receives the motor 3, screws 4 being provided for fixedly mounting the motor thereon.

This bracket is provided with an arm 5 extending around one end of the motor and having the journal portion indicated generally at 6 located in alignment with the motor axis.

This journal portion of the bracket arm is provided with a central opening 7 through which the motor shaft 8 protrudes, the opening being sufficiently large to provide a considerable space between the motor shaft and the journal portion 6. An annular rim flange 9 is formed at the rear or inner side of the journal portion, and one side thereof is recessed as shown at 10 and provided at its lower end with the pocket 11.

The adjustable arm 12 is provided with the split annular portion 13 journalled upon the journal portion 6 of the bracket, a screw 14 being provided for producing the desired amount of friction between the journal and bearing. The annular portion 13 of the arm is provided in its outer side with the annular groove 15 which receives the disk plate 16, screws 17 retaining said plate in position, attached to the journal portion 6 of the bracket, and thus holding the arm 12 against displacement therefrom.

The arm 12 is provided with the longitudinal bore 18 within which is located the sliding plunger 19 having the head 20 at its inner end, a compression spring 21 surrounding the plunger and being interposed between said head and the adjusting nut 22.

The inner end of the bore 18 is enlarged as shown at 23 in Fig. 2 to accommodate the link 24, one end of which is pivoted to the head 20 so as to be movable with relation to the plunger 19, as indicated at 25, the free end thereof being received within the recess 11.

It will be obvious that the pressure of the spring 21 against the head 20 will normally urge the head inward or toward the left hand as viewed in Fig. 2, while the link 24, being pivotally connected to the head and having its lower end pivotally seated in the recess 11, will prevent movement in this direction, the resultant being an upward pressure of the upper side of the head against the upper inner wall of the bore 18, the head being thus frictionally engaged with this upper wall of the bore at all times.

Regardless of the position into which the arm 12 is moved, as shown by both limits of its movement in Fig. 2, the link 24 co-operating with the spring 21 will at all times tend to hold the head 20 in frictional engagement with the upper wall of the bore 18.

It has been found by practical experience that this frictional contact of the head against the wall does not interfere with an easy movement of the arm 12 to any desired position, while at the same time it is sufficient to rigidly hold the arm in any position to which it is moved.

It will be seen that with this invention applied to the cord arm of a dental engine, the arm may be easily and quickly moved to the desired position and held in adjusted position without in any way interfering with the motor, which at all times remains rigidly in position upon a horizontal axis.

It will also be seen that although the invention is illustrated and described as applied to the cord arm of a dental engine, the arm 12 may be used as the supporting arm for a light or for an X-ray machine without in any manner changing any of its construction of the arm or its journal.

I claim:

1. A device including a stationary portion provided with a recess, an arm pivoted thereon and provided with a longitudinal bore, a spring pressed plunger located within said bore and a link movable with relation to the plunger having one end located in said recess and the other end engaging the plunger for holding the plunger in frictional contact with one side of the bore.

2. A device including a stationary portion provided with a recess, an arm pivoted thereon and provided with a longitudinal bore, a spring pressed plunger located within said bore and a link having one end located in said recess and the other end pivotally connected to the plunger for holding the plunger in frictional contact with one side of the bore.

3. A device including a stationary portion provided with a recess, an arm pivoted thereon and provided with a longitudinal bore, a spring pressed plunger carried by the arm and provided with a head, and a link pivotally connected to the head and having one end located in said recess for holding the head in frictional contact with one side of said bore.

4. An adjustable bracket including a stationary member, a tubular arm rotatably mounted thereon, a plunger within the arm, a spring urging the plunger toward the stationary member, and a link having a free end engaging the stationary member and its other end pivotally connected to the plunger.

5. An adjustable bracket including a stationary member, a tubular arm rotatably mounted thereon, a spring pressed plunger within said arm, and an angularly disposed link having one end pivotally connected to said plunger and its other end freely engaging the stationary member, whereby the plunger is held in frictional contact with the wall of the tube.

6. In an adjustable bracket arm provided with a longitudinal bore, a fixed member provided with a recess and having one end of said arm rotatably mounted thereon, a plunger within said bore, a link pivoted at one end to the plunger and having its free end inserted in said recess, and a spring urging the free end of the link into engagement with the fixed member.

7. An adjustable bracket including a stationary member having a slotted recess formed therein, a tubular arm rotatably mounted on said stationary member, a plunger within the arm, an angularly disposed link pivotally connected at one end to the plunger and having its free end inserted in the recess, and a spring within the arm urging the plunger toward the stationary member whereby the free end of the link is held in engagement with said stationary member and the plunger is held in frictional contact with the wall of the tubular arm.

In testimony that I claim the above, I have hereunto subscribed my name.

HENRY E. WEBER.